June 3, 1930.  J. J. LANGER  1,761,042
AUTOMOBILE LOCK
Filed April 11, 1928  3 Sheets-Sheet 1
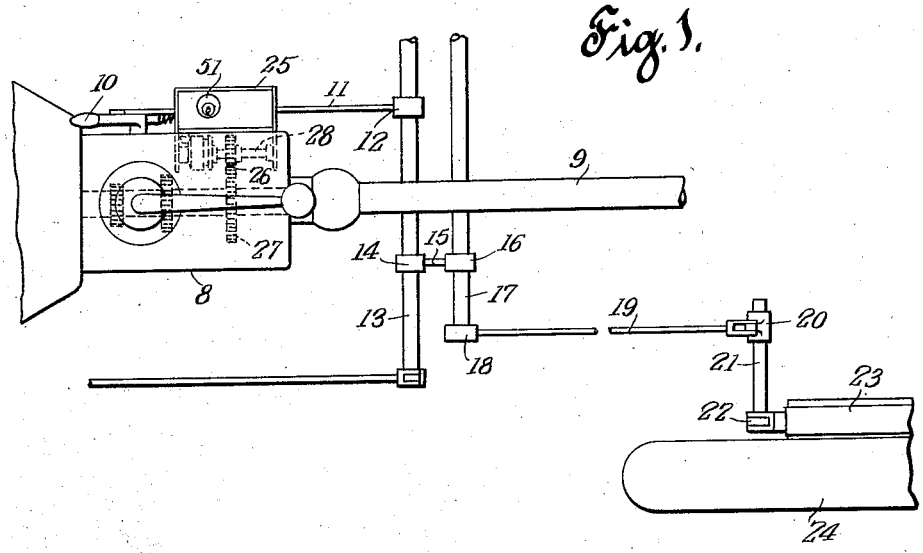
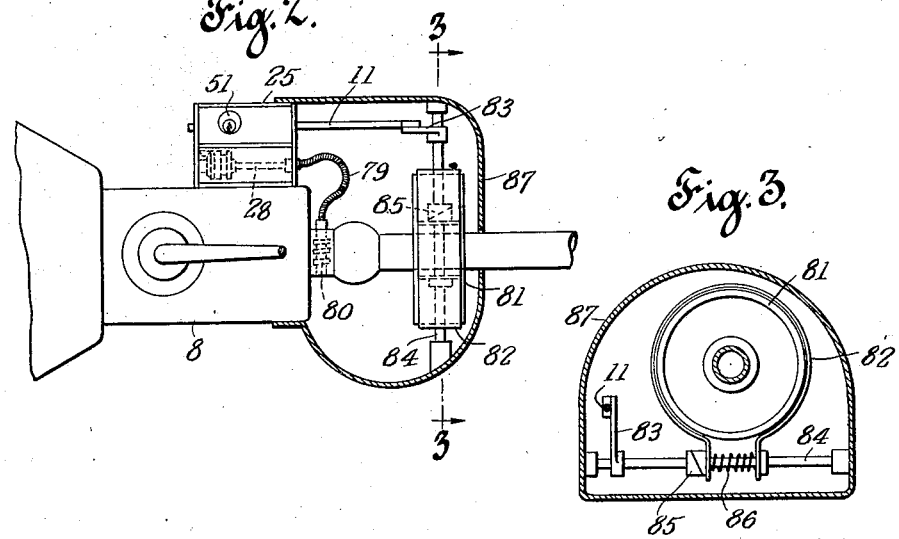
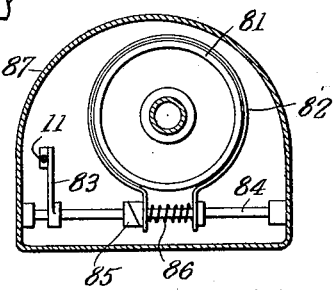
INVENTOR
Julius J. Langer
BY Philip S. McJean ATTORNEY June 3, 1930.   J. J. LANGER   1,761,042
AUTOMOBILE LOCK
Filed April 11, 1928   3 Sheets-Sheet 2

Julius J. Langer INVENTOR
BY Philip S. McKean ATTORNEY

June 3, 1930.  J. J. LANGER  1,761,042
AUTOMOBILE LOCK
Filed April 11, 1928  3 Sheets-Sheet 3

INVENTOR
Julius J. Langer
BY
Philip S. McJean. ATTORNEY

UNITED STATES PATENT OFFICE

JULIUS J. LANGER, OF ASTORIA, NEW YORK

AUTOMOBILE LOCK

Application filed April 11, 1928. Serial No. 269,265.

Special objects of the present invention are to provide a suitable and satisfactory lock for motor vehicles which will allow of certain limited shifting movements of the vehicle, such as are frequently required when a car is left parked at a curb or stored in a public garage.

Other objects are to provide lock mechanism of the character referred to, of a simple, durable and positive acting structure, readily applicable to existing cars.

Other objects and the special novel features of construction, combinations and relations of parts by which the same are attained, are set forth or will become apparent as the specification proceeds.

The drawings accompanying and forming part of this specification illustrate a practical commercial embodiment of the invention, but it should be understood that the structure may vary without departure from the true spirit and broad scope of the invention as hereinafter defined and claimed.

Figure 1 is a broken plan view of the lock mechanism as applied to the transmission and braking system of an ordinary car.

Figure 2 is a broken and part sectional view showing a form of the invention in which the lock is arranged to actuate a special brake on the propeller shaft of the machine.

Figure 3 is a transverse sectional view of the brake structure as on substantially the plane of line 3—3 of Figure 2.

Figure 6 is a cross sectional view of the lock as on substantially the plane of line 6—6 of Figure 5.

Figure 7 is a side elevation of the lock viewed as looking toward the clutch mechanism appearing at the top in Figure 4.

Figure 4:
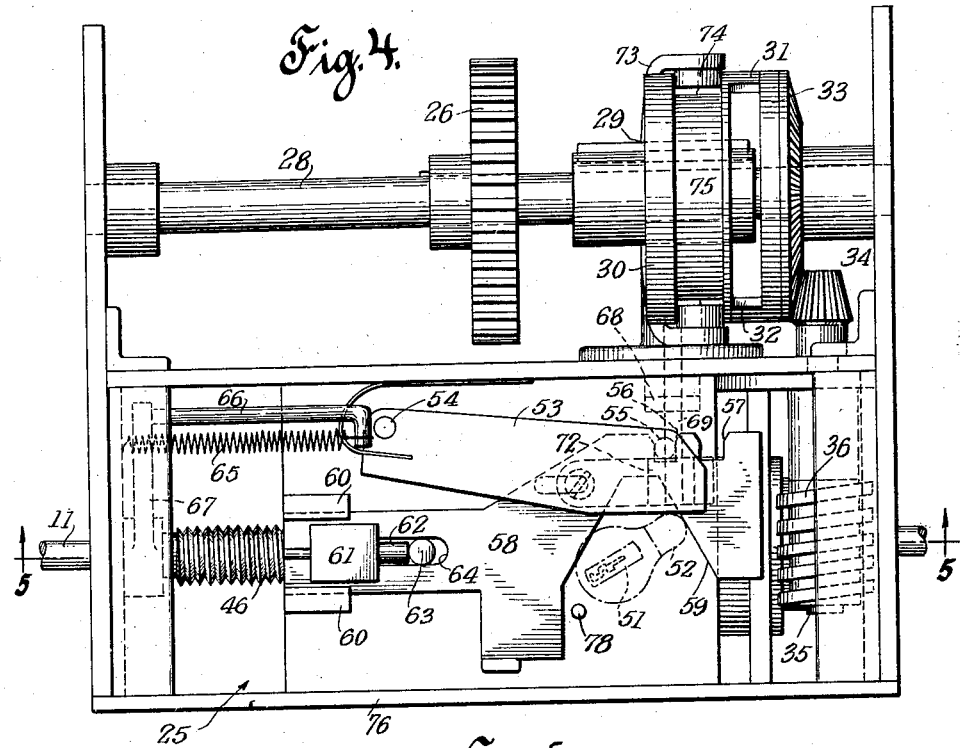
Figure 4 is a plan view of the lock with the cover removed and the brake rod indicated as broken away at opposite ends of the lock casing.

The application of the invention to a motor car of more or less standard construction will be clear from Figure 1, which shows in plan, the transmission or change speed gearing at 8, the propeller shaft 9 extending rearwardly to the differential gearing of the rear axle and part of the brake system, including the hand brake lever 10 connected by brake rod 11 with the rocker arm 12 on cross shaft 13, which latter has a rocker arm 14 connected by link 15 with rocker arm 16 on cross shaft 17, the latter shaft carrying a rocker arm 18 connected by link 19 with rocker arm 20 on brake shaft 21, which is linked at 22 to the brake band 23 of the rear wheel 24. The brake rod 11 is shown as passing through the lock casing 25, which is indicated suitably mounted at the side of the transmission case.

The lock mechanism in the forms of the invention herein disclosed is utilized to apply the service brakes or to set a special brake after the car has been moved a predetermined distance, but the invention broadly contemplates the securing of the car in any other fashion after any movable part of the car has been operated beyond the predetermined permitted extent. In Figures 2 and 3, the propeller shaft is the movable part which is utilized to accomplish the setting of the brakes.

In the first form of the invention, shown in Figure 1 and in detail in Figures 4 to 7, the lock mechanism includes a pinion 26 which is so supported as to extend into the gear case in mesh with one of the gears 27 therein, which rotates when the propeller shaft turns. As will appear from the detail views, this pinion is fast on shaft 28 and on this shaft there is slidingly keyed at 29 a clutch disc 30 having jaws 31 for driving engagement with the jaws 32 on a bevel gear 33 loosely journaled on the shaft and in mesh with a bevel pinion 34 on a cross shaft 35. The latter shaft carries a worm 36 in mesh with a companion spiral gear 37 journaled in a bearing 38 and having a socketed sleeve portion 39 carrying pivot pins 40 for the two hollow segments 41, 42, which at their opposite ends, carry the two halves 43, 44, of a split nut. Springs 45 (Figure 6) interposed between these two halves of the split nut exert their force to open the nut free of the screw sleeve 46 which is mounted to rotate freely about the brake rod 11.

The split nut ends of the segments 41, 42 are shown as tapered and as confined within a tapered socket 47 in the face of a block 48 which is supported and mounted to slide within a suitable bearing 49. It will be obvious that with the sliding of this block, the jaws will be closed upon the screw sleeve, as in Figure 5, or permitted to open to clear the screw, as indicated in the dotted lines.

Figure 5:
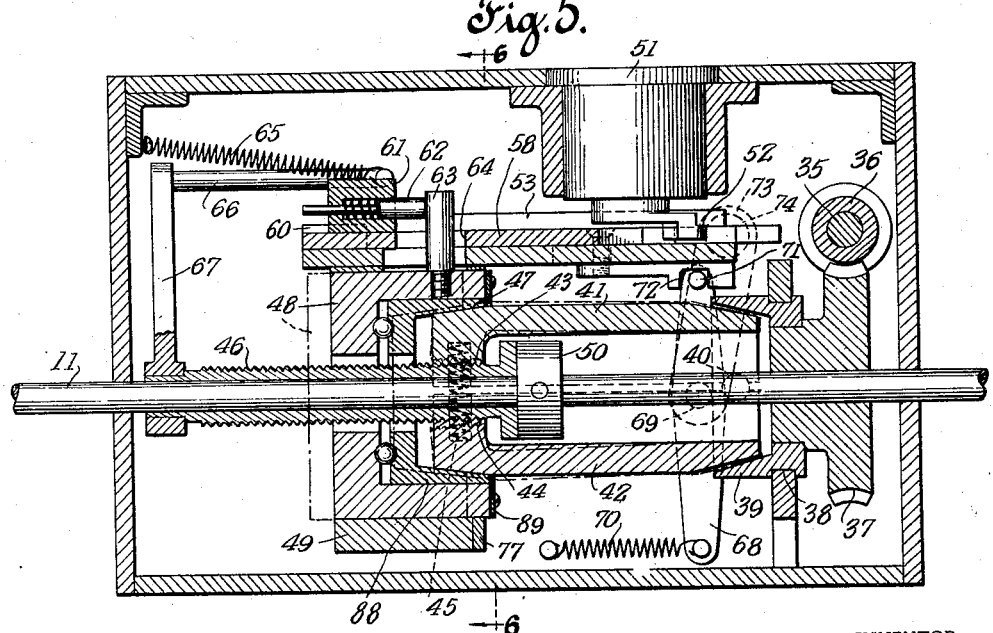
Figure 5 is a vertical sectional view of the lock structure as on substantially the plane of line 5—5 of Figure 4.

When the split nut is closed upon the screw sleeve and rotated, in the manner described, it will advance the sleeve, toward the right in Figure 5, bringing the end of the sleeve against a stop collar 50 on the brake rod. The pitch of the screw thread and the ratio of the gearing described will determine the extent of such movement necessary to carry the brake rod far enough to set the brakes.

The closing of the split nut is controlled by the lock structure, which in the present disclosure, consists of a key operated cylinder lock 51 accessibly mounted in the top of the lock casing and suitably connected with the nut closing block 48.

In Figures 4 and 5, the lock cylinder is shown as carrying a roll-back 52 adapted to lift a latch lever 53 pivoted at 54 and carrying a lock pin 55 engaging in one of two seats 56, 57, in the sliding bolt 58. This sliding bolt is notched at 59 to take the head of the roll-back and the arrangement of parts is such that the first operation of the roll-back is to release the latch and to then throw the bolt one way or the other. The sliding bolt is suitably mounted in guides 60 and is shown as carrying a lug 61 in which there is mounted a spring pressed pin 62 engaging a stud 63 extending up from the nut closing block 48. This stud projects through a slot 64 in the sliding bolt so that when the bolt is thrown back, to the left in Figure 4, the end wall of the slot will engage the stud and carry the block back to the dotted line position, to release the nut from engagement with the screw sleeve. When the screw sleeve is thus released it will be thrown to the left; that is, in a direction to release the brakes by a spring 65, connected with an arm 66 which projects from a lug 67 on one end of the screw sleeve.

The purpose of the spring pressed pin 62 is to afford a yielding connection between the sliding bolt and the stud 63 so that if the halves of the split nut do not exactly mesh with the threads of the screw sleeve at the instant the key is turned, the first rotation of the nut will bring about sufficient of a meshing relation for the spring pressed pin to force the block over and close the nut in proper mesh with the screw.

The clutch operation also is controlled by the key through the medium of a walking beam connection shown in Figure 5 as a lever 68 on a rock shaft 69 acted on at one end by a spring 70 and carrying at its opposite end a lug 71 engaged in a notch 72 on the back of the slide bolt. The outer end of this shaft, Figure 7, carries the yoke or fork 73 provided with pins or rolls 74 engaging in a groove 75 in the sliding clutch member 30. The notch 72 in the back of the bolt is long enough to permit the bolt to be thrown even if the jaws of the clutch are opposite and therefore cannot mesh—under such circumstances, the spring 70 will operate to throw the clutch into mesh as soon as the live clutch member has turned far enough for the jaws of one to get by the jaws of the other.

To prevent the lock being released by removing the side or cover of the lock casing, an interlock is provided between the removable wall and the lock mechanism. In the particular construction illustrated, the removable wall may be considered as the side wall 76 and the interlocking securing means for the same is shown as a yoke 77 projecting into the casing and adapted to encircle or partially enclose the nut closing block when it is shifted into its active nut closing position, as shown in Figures 5 and 6. This effectually locks the cover so that it cannot be removed while the lock is in the locked condition. When, however, the lock is unlocked and the nut closing block is shifted to the dotted line position, Figure 5, the cover is no longer secured by the lock mechanism and may, if desired, be removed for inspection of the parts or for any other purpose.

The lock is preferably so constructed that the key may be removed only when the lock mechanism is in the locked condition. To insure this condition and prevent the driver from removing the key when the mechanism is unlocked, a stop pin is indicated at 78, Figure 4, to prevent the roll-back being turned far enough for removal of the key when the key is turned to unlock the mechanism.

When the lock is in the unlocked condition and the split nut is in the open relation indicated in broken lines, Figure 5, the car may be freely operated, without limit, but when the mechanism is locked and the key is withdrawn as illustrated in the full lines, Figure 5, with the nut closed upon the screw sleeve, the car can be operated only to the limited extent equivalent to the turns of the nut required to shift the screw sleeve to the brake setting position. The parts may be designed to allow any desired free movement, such for instance as might be desirable to allow for the shifting of a car parked at a curb. When locked under such conditions, the car may be freely shifted up to the limit allowed, but as soon as that limit is past, the brakes will be applied and the car be brought to a gradual but positive stop. And it will be observed that any increased effort to move the car simply increases the forceful application of the brakes. The securing of the car is just as effective whether an attempt is made to drive it under its own power or to push or tow the same.

The form of the invention illustrated in Figures 2 and 3 differs from that described, particularly in the method of driving the nut and in the form of the brake. In this second form of the invention, the nut is driven by flexible shafting indicated at 79, operated by a worm gearing 80 from the propeller shaft and a special brake is provided, shown as a brake drum 81 on the propeller shaft, surrounded by a brake band 82. This brake band is indicated as operated from the brake rod 11 by means of a rocker arm 83 with which the brake rod is connected and which rocker arm is fixed to a rock shaft 84, having a brake band operating cam 85 acting on the free end of the brake band in the usual way to close it on the drum against the tension of the brake releasing spring 86. This special brake, it will be observed, is entirely separate and apart from the regular braking system of the car and is encased within a suitable cover 87, rendering it inaccessible so that even if the braking system of the car be made inoperative, this special brake will come into action and stop the car after the predetermined allowed movement is exceeded.

The construction is relatively simple, strong and sturdy and may be built into the car at the time of manufacture or be applied later as a special accessory.

To reduce friction between the parts and to make the jaw closing action easier, the part which actually engages the two segments of the split nut may be in the form of a cup or collar indicated at 88 as rotatably seated in the face of the jaw closing block 48 and as held therein by an overstanding flange 89.

What is claimed is:

1. In motor vehicle locks, the combination with a screw threaded member operative during operation of the vehicle, a split nut surrounding and adapted to be closed onto said screw threaded member, lock governed mechanism for controlling said split nut and brake applying connections operative by said split nut.

2. The combination with a motor vehicle having a brake rod, a screw shaft operable by a moving part of the vehicle, a nut engageable with and disengageable from said screw shaft, connections from said nut to said brake rod and lock mechanism for governing the relation of the screw shaft and nut.

3. The combination with a motor vehicle having a movable element controlling operation of the vehicle, a screw member operable by a moving part of the vehicle, a split nut having segments engageable with and disengageable from said screw member, a cone engageable over said screw segments to close the same upon the screw member, lock mechanism governing the operation of said cone and connections from said nut to the control element aforesaid.

4. The combination with a motor vehicle having a movable member controlling operation of the vehicle, screw and nut elements relatively rotatable to effect translation of one by the rotation of the other, means to effect the rotation of one of said elements by a movable part of the vehicle, said nut element comprising nut segments shiftable into and out of engagement with the screw element, means for closing said segments and for retaining the same close in cooperating engagement with the screw element and lock mechanism for shifting said nut segment closing means.

5. The combination with a motor vehicle having a movable member controlling operation of the vehicle, screw and nut elements relatively rotatable to effect translation of one by the rotation of the other, means to effect the rotation of one of said elements by a movable part of the vehicle, said nut element comprising nut segments shiftable into and out of engagement with the screw elements, means for closing said segments and for retaining the same close in cooperating engagement with the screw element, lock mechanism for shifting said nut segment closing means and means operable by said lock mechanism for clutching and declutching the means for effecting the relative rotation of the screw and nut elements.

6. In combination with a motor vehicle having a movable control element, screw and nut elements mounted for relative translation upon rotation of one with respect to the other, means for rotating one of said elements from a moving part of the vehicle, said nut element being of split construction and having segments with coned surfaces, a nut closing cone engageable over said coned surfaces, lock mechanism for actuating said cone and operating connections from the movable element to the vehicle control element aforesaid.

7. In combination with a motor vehicle having a movable control element, screw and nut elements mounted for relative translation upon rotation of one with respect to the other, means for rotating one of said elements from a moving part of the vehicle, said nut element being of split construction and having segments with coned surfaces, a nut closing cone engageable over said coned surfaces, lock mechanism for actuating said cone and operating connections from the movable element to the vehicle control element aforesaid, said split nut being the rotatable element and the nut closing cone being rotatably supported to turn with the nut.

8. In combination, a motor vehicle having a longitudinal shiftable control rod with a stop thereon, a screw sleeve slidable over said control rod in engagement with said stop, a split nut rotatable by a moving part of the vehicle, a cone for closing said split nut onto the screw sleeve and lock mechanism for shifting said cone.

9. In combination, a motor vehicle having a longitudinally shiftable control rod with a stop thereon, a screw sleeve slidable over said control rod in engagement with said stop, a split nut rotatable by a moving part of the vehicle, a cone for closing said split nut onto the screw sleeve, lock mechanism for shifting said cone and a clutch for controlling the rotation of the split nut, said clutch being controlled by the lock mechanism.

10. In combination with a motor vehicle having a shiftable control element, cooperating nut and screw elements relatively rotatable and arranged to effect operation of the control element upon relative rotation of the same in engaged relation, the nut element being a split construction and comprising nut segments shiftable into and out of cooperative relation to the screw, a segment closing member engaged with said nut segments and lock mechanism for shifting said segment closing member.

In testimony whereof I affix my signature.

JULIUS J. LANGER.